July 26, 1960   D. S. JUSTICE   2,946,204
COMBINED SALT WATER STILL AND FRESH WATER CHILLER
Filed April 16, 1957   2 Sheets-Sheet 1

INVENTOR
Donald S. Justice

July 26, 1960 D. S. JUSTICE 2,946,204
COMBINED SALT WATER STILL AND FRESH WATER CHILLER
Filed April 16, 1957 2 Sheets-Sheet 2

INVENTOR
Donald S. Justice

ATTORNEY

United States Patent Office 2,946,204
Patented July 26, 1960

2,946,204

COMBINED SALT WATER STILL AND FRESH WATER CHILLER

Donald S. Justice, Washington, D.C., assignor to The Justice Company, Washington, D.C., a corporation of the District of Columbia Filed Apr. 16, 1957, Ser. No. 653,109

5 Claims. (Cl. 62—238)

This invention relates to a combination arrangement to produce a liquid density separator, a still, a water chiller, and other utilizable functions. It has, as a principal object, the bringing of a salt water converter capable of turning out fresh water in quantity at an inexpensive rate.

Another object is to produce fresh water from polluted water or sea water, at low temperature for such uses as air conditioning and then flowing on to other uses of clean water.

Another object is to separate sea water as a returnable waste, or for salt salvage and mineral recovery, from water that may be used in irrigating arid lands.

Another object is to produce a refrigeration and still combination with each part serving the other for an overall efficiency.

Still another object is to produce a density separator for use in industries such as petroleum, whiskey, creamery, and chemical.

These and other objects will become more apparent to those skilled in the art as they relate the descriptive matter to the drawing in which.

The elevational views show liquid content centrifugally standing against vertical walls and forming a center surface vertically.

In the general concept of stills the change of liquid to vapor is accomplished by heat to cause boiling. The vapor is then condensed by cooling through some conventional manner. In the present combination evaporation of the liquid is accomplished by a number of favorable factors, and the same is true for vapor condensation including cooling through inexpensive refrigeration means.

Figure 4:
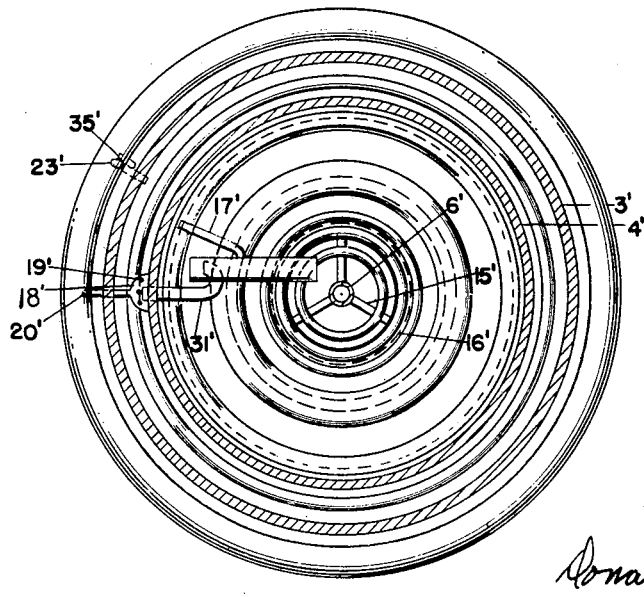
Figure 4 is a top plan section.

Referring to the drawing the numerical designation refer to like parts throughout and the prime numbers usually refer to a different view of the same part. The illustrations show the system in motion with sufficient rotation to hold a space column about the axis defined by a cylindrical surface of liquid 16 and 16' held by centrifugal force. Numeral 1 designates an annular compression and condensing chamber for vapor forced from an inner liquid containing chamber 2. Chamber 1 has exterior cylinder wall 3 (shown at 3' in Figs. 2 and 4) and interior cylinder wall 4 (shown at 4' in Figs. 2 and 4) to form concentric cylinders having a common bottom member 5 and a common top member 7. Extending from the center of bottom 5 through the center of top 7 there may be a shaft 6 (shown at 6' in Figs. 2 and 4) having a hollow end portion 10 which is in communication with a stationary liquid source pipe 13 through a rotary seal 14. The shaft 6 is optional and may be omitted in case it is not needed for actual rotational force, or preferred for support as later indicated. Radial conduits extend from hollow shaft portion or pipe 10 to centrifugally force liquid into chamber 2. These radial conduits are designated 11 and 12 and they are sized according to the predetermined output of the device as will become apparent.

Within a sealed device so formed there is fixed a rotating refrigerating apparatus for rotation as a unit. The refrigerating apparatus is attached in such manner that the heating elements are within chamber 2 where support may be had on shaft 6 or the wall 4, and the cooling elements are within annular chamber 1. Any suitable rotating refrigerating device may be used and these illustrations show preference to the device of my Patent 2,724,953 and my application for patent Serial No. 519,201, filed June 30, 1955, now Patent No. 2,924,081, granted February 9, 1960. Rotating refrigerating devices in accordance with my aforesaid application are used for purposes of illustration in the drawings of the present application.

Figure 1:
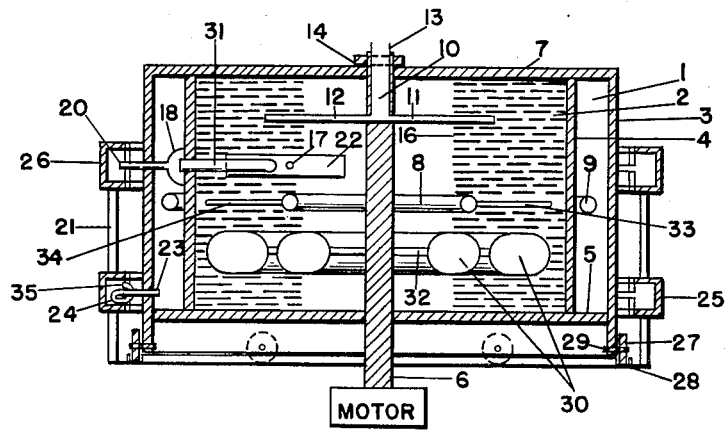
Figure 1 is an elevational view in section of the combination which embodies the invention.

Continuing with Fig. 1, the heating element of the simplified version of the refrigerating structure is shown at 8 in chamber 2, and the cooling or evaporator element is shown at 9 in chamber 1. Numerals 8 and 9 represent the hermetically sealed refrigeration device which may be supported by spider structure 15'. Such device contains a volatile refrigerant which flows as liquid from ring 8 to ring 9 through a capillary tube 33, and flows as refrigerant vapor from ring 9 into ring 8 through vapor tube 34. The tubes 33 and 34 pass through passageways in cylinder wall 4 in such sealed manner that liquid in chamber 2 does not escape. These tubes 33 and 34 may be arranged to support the refrigerating device instead of spider 15'.

Numeral 31 (shown at 31' in Figs. 2 and 4) designate a pump tube for centrifugally flowing liquid and vapor from chamber 2. Pump tube 31 extends radially from pipe 22 and passes through cylinder wall 4. Pipe 22 is of greater dimension than tube 31 and it may have a bent portion about the radially inward end of tube 31 so as to form a syphon in the pump tube. Pipe 22 extends axially inward to an open end positioned adjacent the axis of rotation. Pipe 22 has an open passageway 17 for freely admitting liquid. Passageway 17 is sized to less flow capacity than pump tube 31 so that tube 31 syphons gas or vapor in the space differential resulting from liquid flow limitation by passageway 17. Such vapor is drawn through the open end of pipe 22 and thus a low pressure is maintained about the shaft or in the center portion of chamber 2. It will be noticed that pump tube 31 with its syphon bend, pipe 22 with its open end and its closed end and having passageway 17 or pipe 17', forms a pump tube unit or assembly.

Figure 2:
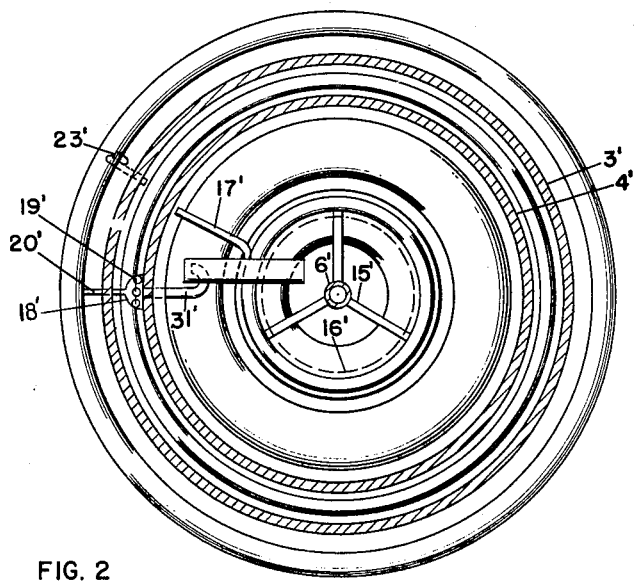
Figure 2 is a top plan section of Figure 1.

Passageway 17 in Fig. 1 is shown as a pipe 17' in Fig. 2 to illustrate the manner of receiving the highest density liquid centrifugally standing against the cylinder wall 4. No change is made in the passageway size so that as an aperture or as a pipe the limited flow capacity of pipe 17' or passageway 17 is the same. Liquid enters chamber 2 in rotation and stands against cylinder wall 4 by centrifugal force, and the open end of pipe 17' becomes immersed. Liquid continuing to enter chamber 2 enters pipe 17' and progresses radially inward as the surface of the liquid rises radially inward. At the bend shown in pipe 17' liquid overflows into pipe 22 and flows outward by centrifugal force to collect at the closed end of pipe 22 and cover the bent end of pump tube 31. Pipe 22 is closed at the radial end which causes such liquid to collect and overflow the syphon bend in pump tube 31. The liquid level quickly recedes in pipe 22 because of the greater flow capacity of tube 31 over the flow capacity of passageway 17. The end of the liquid column passing into tube 31 acts as a piston to create a low pressure in its wake. Vapor in pipe 22 moves in to fill the void of such wake until the bent end of tube 31 is filled with liquid again by the constant flow of passageway 17 or pipe 17'. Thereafter this operation is repetitious so that liquid and vapor are flowing in tube 31 simultaneously though separately and usually as alternating segments.

From the foregoing it is obvious that pipe 17' may have a predetermined length which selectively places its radial end so that liquid of a desirable density settlement is withdrawn. Liquid expelled by pipe 17' and tube 31 may have further use according to its density. Further use may include salt extraction, mineral separation, etc.

Through the wall 4, tube 31 empties into a liquid and vapor separator 18 as shown in Fig. 1, and 18' as shown in Fig. 2. The liquid, being more dense flows on radially outward through outlet pipe 20. Pipe 20 (shown at 20' in Figs. 2 and 4) is sized according to passageway 17 so that liquid only has passage space. Pipe 20 may be slightly smaller than 17 because of the different radial distance from the axis causing a greater centrifugal force in pipe 20. Vapor forced into separator 18 or 18' may pass into chamber 1 through provided apertures in the axially inward portion of the separator. Such apertures are shown at 19' in Fig. 2. Since the vapor is forced into the separator it is also forced through the apertures into chamber 1 and thus pressure builds in chamber 1. Such pressure causes the heat of compression to be present in chamber 1 and about the cooling element 9. This heat enters cooling element 9 through its walls by conduction and it is there absorbed by the refrigerant. The heat expands the refrigerant and aids in the process of its evaporation. The compressed vapor in chamber 1 is thus cooled to its condensing temperature commensurate with its pressure and thus condensation occurs. On formation condensate is a concentration of mass subject to centrifugal force as such, and it falls against exterior wall 3 on the inner surface by such force.

Figure 3:
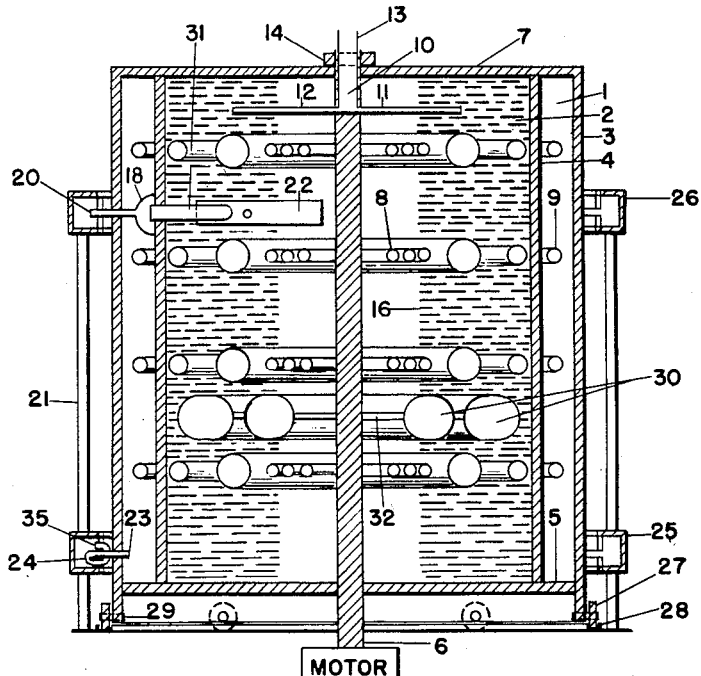
Figure 3 is an elevational section view showing a preferred type refrigerating device in plurality and as if rotating.

The interior surface of wall 3 would accumulate a layer of centrifugally standing condensate except that outlet pipe 23, as shown in Fig. 1 and Fig. 3, is provided for immediate drainage. Centrifugal force drains the condensate through pipe 23 into a double U trap designated 24. Pipe 23 is shown at 23' in Fig. 2 and Fig. 4. The U trap is dual operating in that the U bend in pipe 23 bent against itself for a centrifuging trap, and it is bent across its bight for a lower level trap by gravity for use when the device is at rest. The purpose of the gravity trap is to save enough liquid for priming the centrifuging trap in the initial period of operation. A priming supply of liquid may be charged in manufacture. It will be noted that open end 35 (shown at 35' in Fig. 4) of pipe 23 is radially retarded to prevent the priming liquid from exhausting. Such liquid in the trap 24 stops gas from passing and allows compression to the extent of centrifugal force in the liquid. A pressure relief valve may be used in pipe 23 to serve the same purpose.

Numeral 30 designates an optional part which may be used for displacement of liquid. As shown in Figs. 1 and 3 such displacement rings 30 be attached by support 32 if a shaft is used. Depending on the manner of forcing rotation a shaft 6 may or may not be used. Where used, however, displacement rings such as shown at 30 may be supported on the shaft by supports 32 which are similar to spider supports 15'. Hollow rings 30 may be made of any suitable light weight material and supported by refrigerating devices, the wall 4, or otherwise. In any event care should be used to allow free liquid circulation about such rings in order to preserve density separation freedom. The purpose of such space consuming rings is to conserve in the total weight of liquid to be held in rotation and thus reduce power requirements. The refrigeration condenser elements may be enlarged to serve the same purpose. In this connection Fig. 1 shows refrigerant condenser element as prior to immersion by liquid. Elements 8 may be arranged in vertical instead of horizontal facing to be congruent and appropriate with the immersing liquid surface layer presented by centrifugal formation.

Numeral 25 designates a condensate or fresh water catch or collector. Numeral 26 desigates a similar catch, gutter, or trough for salt water waste or other unused liquid. Any suitable stationary collector and delivery system may be used. As shown in the illustrations collectors 25 and 26 are supported by upright members 21 and encircle the invention as continuous troughs from which liquid may be piped.

The entire basic structure may be made of materials best suited to its intended use and the fabrication will be in accord with the material selected. For salt water the container and walls may be formed in concrete, plastics, and other mouldable materials. Casting may be used. The refrigerating device may be fitted into a form or die prior to pouring formation material. Any suitable method and means of construtcion will not deviate from the invention of the herein combination.

Rotation of the entire structure and support of the structure may be accomplished in any suitable manner and by any suitable power. As shown in the illustrations wheels 27 turn on axle 29 in an annular track 28. Axle 29 is supported in an annular skirt extension of cylindrical wall 3. A prime mover which, for the illustrations, is shown as motor may be used to rotate the structure.

*Operation*

In operating the unit the speed is predetermined to give sufficient centrifugal force to operate the refrigerating device commensurate with the desired action of the water or other liquid. In a preferred operation the sizing, pressures, speed, and other individual control factors will have been relatively fixed so as to be adjusted to the most efficient end result. As an example sea water may be used with a maximum conversion to fresh water and a minimum waste water as the result desired. In the following example a 50% production of each will lend itself for clear illustration.

Salt water or sea water at receiving density and temperature is introduced from the supply source pipe 13 through the rotary seal 14 and distributed by centrifugal force to a point of median radius in chamber 2. Such water tends to fill the chamber and the air is driven out through the passageway 17, 18, and 20 until such time as the centrifugally standing water surface approaches the axis sufficiently to overflow in passageway 17. Immediately following, the pump tube bend overflows and the syphon action begins through self priming. Liquid then flowing outward in pump tube 31 is in greater quantity than can be supplied by the smaller passageway 17 so that the liquid surface in pipe 22 recedes to admit air in the wake of liquid flowing in the pump tube. The force of flow liquid in the pump tube is commensurate with centrifugal force at a given radial point and thus the tendency toward a vacuum is high, and the available air supply is limited to the remaining central space. As this action continues the air in chamber 2 is exhausted and low pressure obtains in the remaining columnar space about the axis.

As the liquid leaves chamber 2 it is caught in separator 18 and centrifugally forced radially outward through pipe 20 as waste. The capacity of pipe 20 is sized to take this quantity only and thus the air is forced through apertures 19' into chamber 1. Such air accumulation in chamber 1 causes the heat of compression.

In the meantime the refrigerating device, which operates by centrifugal force, has been passing liquid refrigerant through expansion means into its cooling element 9. The heat of compression now in chamber 1 is absorbed by the walls of cooling element 9 and passes through the walls to be absorbed by the refrigerant. Such heat aids expansion and vaporization of the refrigerant. As pressure accumulates in the refrigerant vapor is forced radially inward, against centrifugal force, through its vapor passageway 34 into its heating element which is shown as refrigerant condenser 8. In Fig. 3 the refrigerating device shown has its own refrigerant pump tube to boost the inward radial progress and increase refrigerant pressure in heating element 8.

During the foregoing procedure the salt water surface has continued to approach the axis of rotation for the reason that approximately twice the quantity is being introduced into chamber 2 than can pass through passageway 17, under the 50% example. As a consequence heating element 8 is immersed in salt water and is cooled thereby. Refrigerant gas condensing releases its heat of vaporization and the heat passes through the wall of element 8 to be absorbed by the water adjacent its surface.

As the first water enters chamber 2 it is immediately subject to centrifugal force to the extent of the speed of rotation at the radius of wall 4. Under such force the heavier particles or small units of water stand against wall 4. As the water continues to accumulate this influence continues and, consequently, there is a density separation commensurate with the force. To this extent the lighter units of water are always on the centrifugally standing surface. In this example of salt water, the water heaviest with salt is against wall 4 and the more volatile water is on the surface. When water immerses element 8 and absorbs its heat there is further density separation in the water. It is a well known fact that cold water is more dense than hot water. As a consequence the water heated by element 8 flows toward the surface and thus the water containing the most heat and being most volatile is on the surface.

As mentioned before the action of pump tube 31 has caused a low pressure about the axis because the denser water outflowing pulls a high quantity of the lighter vapor. It is also a well known fact that a reduction of pressure on a liquid surface lowers the boiling point. It will be seen then that the salt water of least density has been heat separated into further low density and higher volatility and its surface confronted with low pressure. The boiling point being lower the water boils or vaporizes and the resulting vapor enters pipe 22 to supply the pump tube 31.

Water vapor is now supplied in chamber 1 instead of the original displaced air. The vapor is compressed as the air was compressed. Such vapor under pressure is cooled by the cooling element 9 and its condensing temperature is reached. Condensation occurs and the heat of vaporization is liberated to be absorbed in element 9 for return by refrigerant gas to the heating element 8 and thus replaced in the ever changing salt water. The condensate in chamber 1 is distilled salt water and thus it is pure water or fresh water. In formation the condensate is subject to centrifugal force and falls against the inner surface of wall 3 where, on spreading, it flows through pipe 23 and, unlike the original air, it overflows the U trap bend to pass out of pipe end 35 into the fresh water catch and delivery system 25.

In the use of a number of refrigerating devices as shown in Fig. 3 some of the heating elements 8 may be positioned at greater radius than others. This will afford more cooling influence from the salt water at its receiving temperature, but the heat absorbed by the water will be at greater radius and some of it will be dissipated in the so-called waste. The secondary effect is increased refrigerative effect in the cooling element 9 and consequently in the condensate or fresh water. In this manner the fresh water may be delivered in a chilled condition if desired.

Many other changes, additions, and alterations will be apparent to those skilled in the art without deviating from the spirit of the invention in which I claim:

1. In apparatus for treating liquids, a first container, a second container, means for revolving the containers about an axis, means to position the second container at a greater radial distance from the axis than the first container, means for delivering liquid to be treated into the first container, conduit means communicating between the containers and having its inlet in the first container adjacent the side thereof nearest said axis, a heat transfer circuit having a heat absorbing portion within the second container and a heat dissipating portion within the first container, said dissipating portion being positioned in said first container away from the radially outermost side thereof, the arrangement being such that the liquid in the first container is centrifugally maintained in the first container to present a vaporization surface and vapor formed thereat surrounds said inlet and passes through said conduit means to said second container and condenses to liquid therein delivering heat to said transfer circuit, said heat being delivered via said heat transfer circuit to said liquid in the first container at or near said vaporization surface to enhance vaporization thereat.

2. Apparatus as in claim 1 including in said conduit means a liquid-vapor pump with a liquid inlet supply for said pump positioned in said first container at a distance from said axis greater than the distance from said axis to said heat dissipating means.

3. Apparatus as in claim 2 wherein the means for delivering liquid into said first container exceeds in volumetric capacity the liquid inlet means of said pump.

4. Apparatus as in claim 2 and including means for delivering from the second container liquid resulting from condensation separate from liquid delivered thereto through said pump.

5. Apparatus as in claim 2 and including means in said second container for separating the liquid from the vapor delivered through said pump, and means for maintaining separation of the pumping liquid from the condensed liquid in the second container.

References Cited in the file of this patent

UNITED STATES PATENTS

| | | |
|---|---|---|
| 1,999,712 | Zorn et al. | Apr. 30, 1935 |
| 2,705,407 | Colonna | Apr. 5, 1955 |